(12) United States Patent
Lin (10) Patent No.: US 10,847,100 B2
(45) Date of Patent: Nov. 24, 2020

(54) IMAGE DISPLAY METHOD AND DISPLAY SYSTEM CAPABLE OF AVOIDING AN IMAGE FLICKERING EFFECT

(71) Applicant: BENQ CORPORATION, Taipei (TW)

(72) Inventor: Hsin-Nan Lin, Taipei (TW)

(73) Assignee: BenQ Corporation, Taipei (TW)

( * ) Notice: Subject to any disclaimer, the term of this patent is extended or adjusted under 35 U.S.C. 154(b) by 213 days.

(21) Appl. No.: 16/019,550

(22) Filed: Jun. 27, 2018

(65) Prior Publication Data

US 2019/0035344 A1  Jan. 31, 2019

(30) Foreign Application Priority Data

Jul. 31, 2017 (CN) .......................... 2017 1 0635755

(51) Int. Cl.
  *G09G 3/36* (2006.01)
  *G02F 1/13357* (2006.01)
  *G09G 3/34* (2006.01)

(52) U.S. Cl.
  CPC ..... *G09G 3/3611* (2013.01); *G02F 1/133603* (2013.01); *G09G 3/3406* (2013.01); *G09G 3/3648* (2013.01); *G09G 2310/0237* (2013.01); *G09G 2310/0264* (2013.01); *G09G 2310/08* (2013.01); *G09G 2320/0247* (2013.01); *G09G 2320/0257* (2013.01)

(58) Field of Classification Search
  CPC .. G09G 3/3611; G09G 3/3406; G09G 3/3648; G09G 2310/0237; G09G 2310/0264; G09G 2310/08; G09G 2320/0247; G09G 2320/0257; G02F 1/133603
  See application file for complete search history.

(56) References Cited

U.S. PATENT DOCUMENTS

| 2007/0211014 A1* | 9/2007 | Kim ..................... G09G 3/3406 345/102 |
| 2008/0143757 A1* | 6/2008 | Furihata ............... G09G 3/3406 345/690 |
| 2013/0342434 A1 | 12/2013 | Chen |

FOREIGN PATENT DOCUMENTS

| CN | 102547318 A | 7/2012 |
| TW | 201306014 A1 | 2/2013 |
| WO | 2008/072161 A1 | 6/2008 |

\* cited by examiner

*Primary Examiner* — Sahlu Okebato (57) ABSTRACT

An image display method includes acquiring a data clock signal, generating a backlight driving signal according to the data clock signal, and displaying an image according to at least the data clock signal and the backlight driving signal by a display system. The data clock signal includes a first data square wave and a second data square wave. The first data square wave and the second data square wave are periodically transmitted. Each of the first data square wave and the second data square wave has a data period. The backlight driving signal includes a first backlight square wave and a second backlight square wave. The first backlight square wave and the second backlight square wave are periodically transmitted. Each of the first backlight square wave and the second backlight square wave has a backlight period. The data period is greater than the backlight period.

20 Claims, 6 Drawing Sheets

IMAGE DISPLAY METHOD AND DISPLAY SYSTEM CAPABLE OF AVOIDING AN IMAGE FLICKERING EFFECT

BACKGROUND OF THE INVENTION

1. Field of the Invention

The present invention illustrates an image display method and a display System, and more particularly, an image display method and a display System capable of avoiding an image flickering effect.

2. Description of the Prior Art

Liquid crystal display (LCD) and organic light emitting diode (OLED) devices have been widely used in our daily life because they take advantages of thin appearance, low power consumption and no radiation. For example, the LCD and OLED devices can be applied to multimedia players, mobile phones, personal digital assistants, computer monitors, or flat-screen TVs.

In general, when a display device displays an image, the display device can use a pulse width modulation (PWM) signal for driving a backlight device in order to generate a backlight signal. Further, the backlight signal can be operated under a turn-on state during a time interval. The backlight signal can be operated under a turn-off state during another time interval. When a process of refreshing pixels is visible, an image flickering effect is unavoidable. Therefore, when a user watches the image displayed on the display device, it is easy to feel the flickering effect, leading to reduced visual quality. Further, when the display device displays the image, a frequency of the backlight signal generated by the backlight device has to match (or say, synchronize) a frequency of a data clock signal of the image. Therefore, when the frequency of the data clock signal is low, the frequency of the backlight signal generated by the backlight device is also decreased accordingly. However, it is hard to trigger visual persistence of human eyes because of insufficient frequency of the backlight signal. In other words, when the human eyes are watching the image generated by the display device with low frequency backlight, the visual experience is poor because of severe image flickering effect. Additionally, the image flickering effect of the display device is adverse to the human eyes.

SUMMARY OF THE INVENTION

In an embodiment of the present invention, an image display method is disclosed. The image display method comprises acquiring a data clock signal, generating a backlight driving signal according to the data clock signal, and displaying an image according to at least the data clock signal and the backlight driving signal by a display system. The data clock signal comprises a first data square wave and a second data square wave. The first data square wave and the second data square wave are periodically transmitted. Each of the first data square wave and the second data square wave has a data period. The backlight driving signal comprises a first backlight square wave and a second backlight square wave. The first backlight square wave and the second backlight square wave are periodically transmitted. Each of the first backlight square wave and the second backlight square wave has a backlight period. The data period is greater than the backlight period.

In another embodiment of the present invention, a display system is disclosed. The display system comprises a processor, a pixel array, an image driving device, a backlight module, and a backlight driving device. The processor is configured to generate a data clock signal and generate a backlight driving signal according to the data clock signal. The pixel array is configured to generate an image. The image driving device is coupled to the processor and the pixel array and configured to control the pixel array according to the data clock signal. The backlight module is configured to generate a backlight signal. The backlight driving device is coupled to the processor and the backlight module and configured to control the backlight module according to the backlight driving signal. The data clock signal comprises a first data square wave and a second data square wave. The first data square wave and the second data square wave are periodically transmitted. Each of the first data square wave and the second data square wave has a data period. The backlight driving signal comprises a first backlight square wave and a second backlight square wave. The first backlight square wave and the second backlight square wave are periodically transmitted. Each of the first backlight square wave and the second backlight square wave has a backlight period. The data period is greater than the backlight period.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
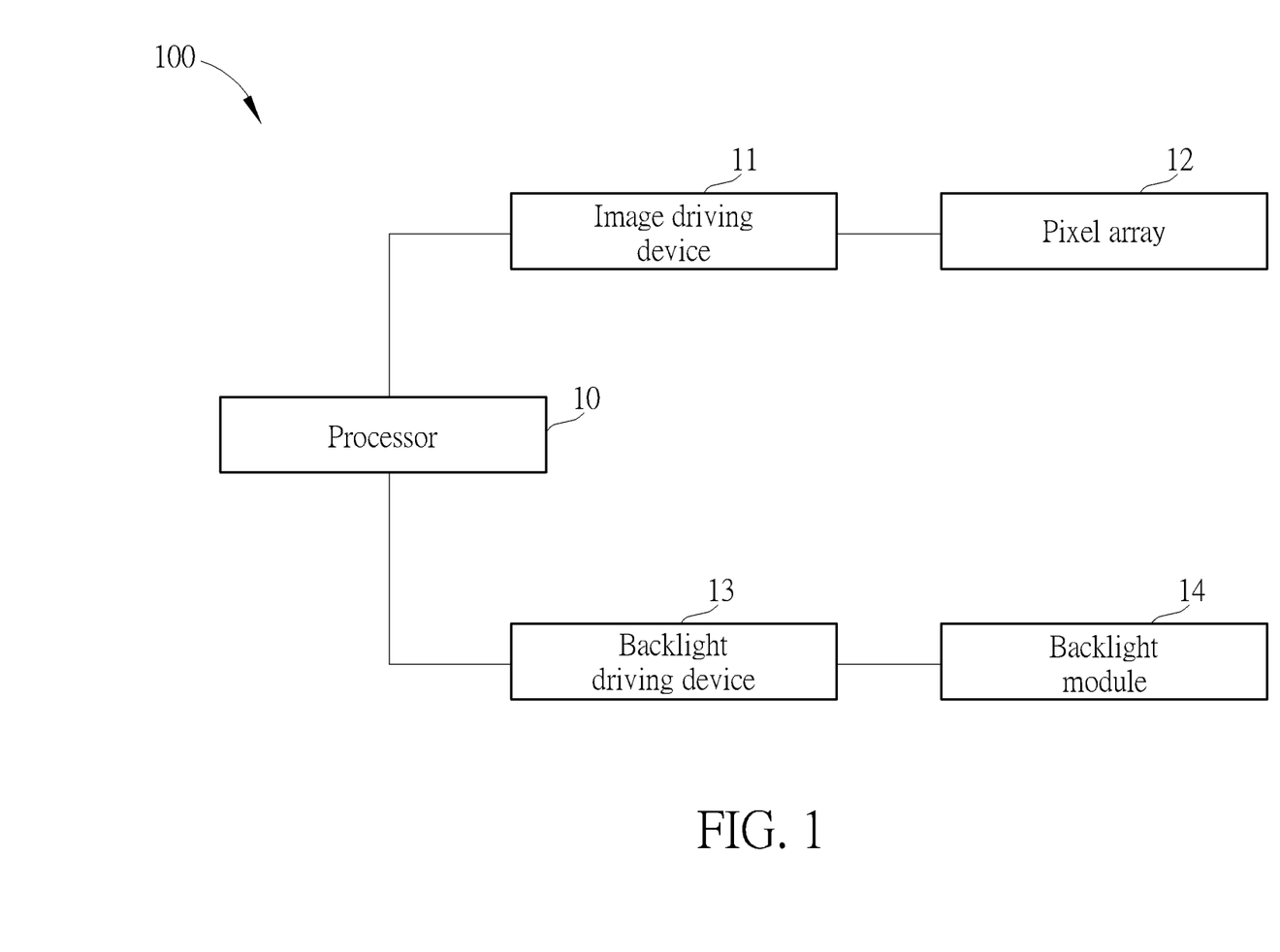
FIG. 1 is a block diagram of a display system according to an embodiment of the present invention.

FIG. 1 is a block diagram of a display system 100 according to the embodiment of the present invention. The display 100 includes a processor 10, an image driving device 11, a pixel array 12, a backlight driving device 13, and a backlight module 14. The processor 10 can be any logic device, such as a chip processor (i.e., a scalar), a central processing unit (CPU), a microprocessor, or a programmable control unit. The image driving device 11 is coupled to the processor 10 for driving the pixel array 12 by a pixel driving voltage. The backlight driving device 13 is coupled to the processor 10 for driving the backlight module 14 by a backlight driving voltage. The image driving device 11 can be any driving device capable of driving scan lines and data lines, including shift registers. The image driving device 11 can drive the pixel array 12 by using a row-by-row driving mode. The pixel array 12 can be any optical component capable of performing a color display function. The backlight driving device 13 can be any device capable of driving the backlight module 14 according to a pulse width modulation (PWM) signal. The backlight module 14 can be any light emitting device. For example, the backlight module 14 can include at least one light emitting diode (LED) string. In the display system 100, the processor 10 is used for generating a data clock signal and generating a backlight driving signal according to the data clock signal. The data clock signal can also be a PWM signal with a default frequency or a user-defined frequency, such as 60 Hertz. The image driving device 11 can adjust liquid crystal polarities of pixels in the pixel array 12 according to the data clock signal and image data. The image data can be inputted to the display system 100 from an external device, such as a media player or a video source of a computer. The backlight driving device 13 can control the backlight module 14 for generating a backlight signal according to the backlight driving signal. The backlight signal can be regarded as an optical signal. An image display method of the display 100 is illustrated later.

Figure 2:
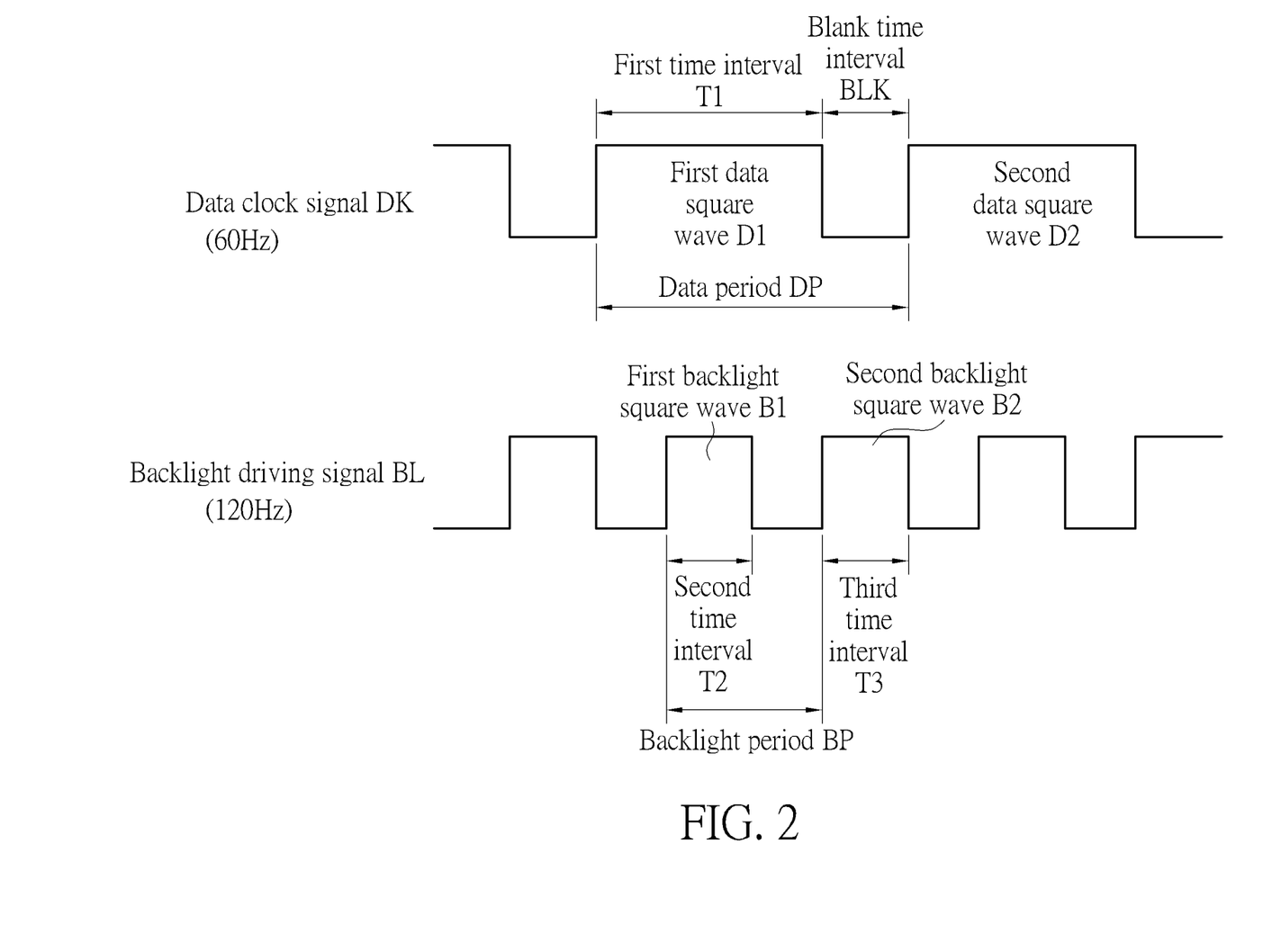
FIG. 2 is an illustration of a data clock signal and a backlight driving signal of the display system in FIG. 1.

FIG. 2 is an illustration of the data clock signal DK and the backlight driving signal BL of the display system 100. The data clock signal DK can be a periodic square wave signal. For example, a frequency of the data clock signal DK can be equal to 60 Hertz. The data clock signal DK can include a plurality of square waves, such as a first data square wave D1 and a second data square wave D2. Widths of the first data square wave D1 and the second data square wave D2 can be identical. In the embodiment, the widths of the first data square wave D1 and the second data square wave D2 can correspond to a time length of a first time interval T1. Further, a blank time interval BLK is allocated between the first data square wave D1 and the second data square wave D2. The first data square wave D1 and the second data square wave D2 can be periodically transmitted. For example, a data period DP of the data clock signal DK can be defined as a fixed time interval from timing of a rising edge of the first data square wave D1 to timing of a rising edge of the second data square wave D2. When the frequency of the data clock signal DK is equal to 60 Hertz, the data period DP is equal to $1/60$ seconds. Similarly, the backlight driving signal BL can be a PWM signal including a plurality of square waves. For example, the backlight driving signal BL can include a first backlight square wave B1 and a second backlight square wave B2. A width of the first backlight square wave B1 can correspond to a time length of a second time interval T2. A width of the second backlight square wave B2 can correspond to a time length of a third time interval T3. The second time interval T2 is within the first time interval T1. The third time interval T3 is within the blank time interval BLK. The first backlight square wave B1 and the second backlight square wave B2 can be periodically transmitted. For example, a backlight period BP of the backlight driving signal BL can be defined as a fixed time interval from the timing of a rising edge of the first backlight square wave B1 to the timing of a rising edge of the second backlight square wave B2. The data period DP is greater than the backlight period BP. As previously mentioned, when the data period DP is equal to $1/60$ seconds, the backlight period BP can be set around $1/120$ seconds. Equivalently, when the backlight period BP is around $1/120$ seconds, a frequency of the backlight driving signal BL is around 120 Hertz. However, the present invention is not limited to using the data clock signal DK with 60 Hertz and the backlight driving signal BL with 120 Hertz. For example, the frequency of the backlight driving signal BL can be N times the frequency of the data clock signal DK. N is a positive integer greater than one. In FIG. 2, the frequency of the backlight driving signal BL is greater than the frequency of the data clock signal DK. Further, for human eyes, an image is visible during the third time interval T3 and the second time interval within a data period DP. By doing so, visual persistence of the human eyes can be triggered, avoiding flickering visual experience.

Figure 3:
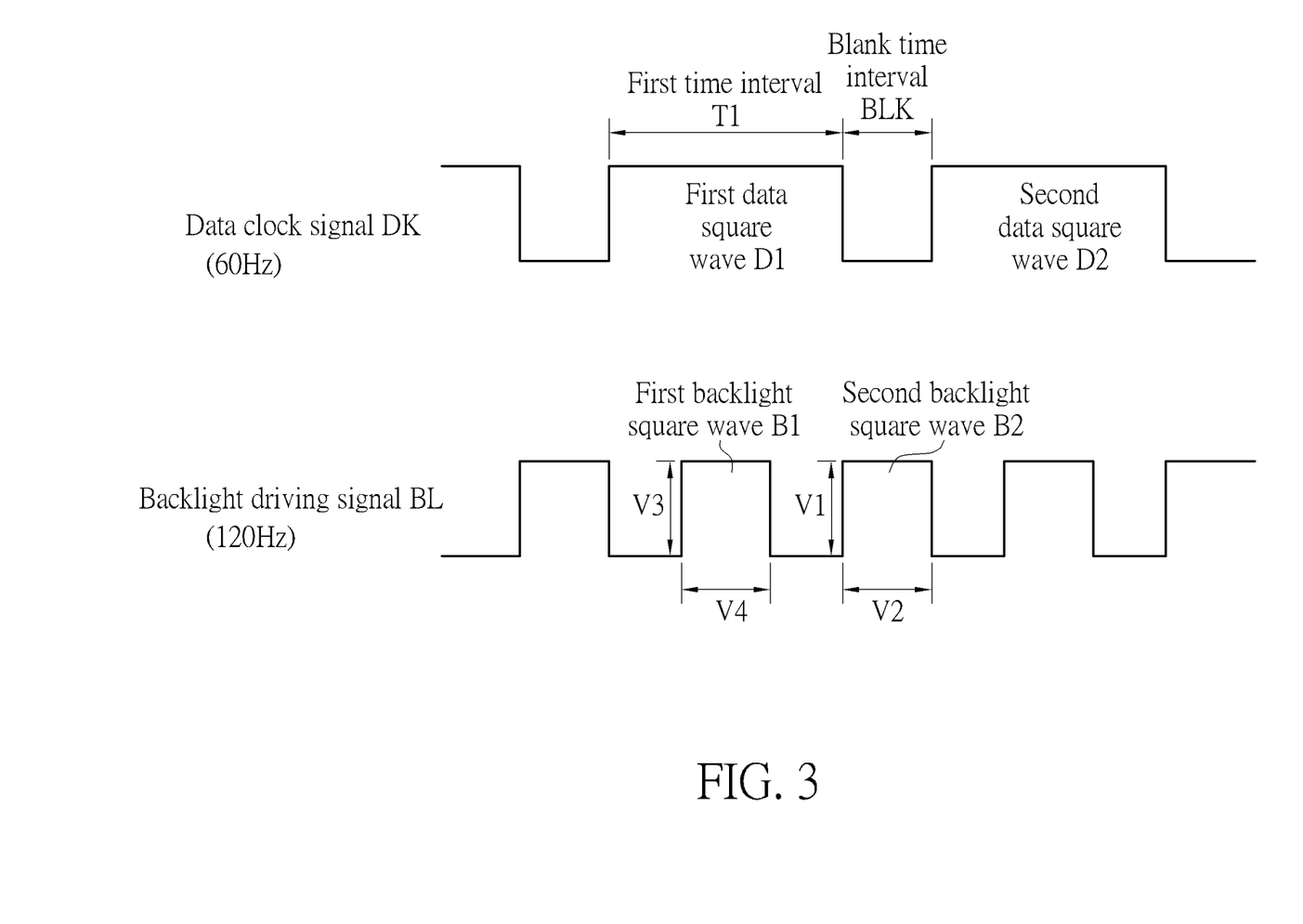
FIG. 3 is an illustration of widths and heights of a first backlight square wave and a second backlight square wave of the display system in FIG. 1.

FIG. 3 is an illustration of widths and heights of a first backlight square wave B1 and a second backlight square wave B2 of the display system 100. For simplicity, the first backlight square wave B1 and the second backlight square wave B2 within the data period DP are illustrated below. Particularly, all pair-wised backlight square waves of the backlight driving signal BL can be configured according to the first backlight square wave B1 and the second backlight square wave B2. In FIG. 3, a height of the second backlight square wave B2 can be set to a first value V1. A width of the second backlight square wave B2 can be set to a second value V2. A height of the first backlight square wave B1 can be set to a third value V3. A width of the first backlight square wave B1 can be set to a fourth value V4. The first value V1, the second value V2, the third value V3, and the fourth value V4 are positive values. Further, the first value V1, the second value V2, the third value V3, and the fourth value V4 depend on an image brightness configuration value during the data period DP. For example, when the image brightness configuration value is equal to L, L can be derived as $L=(V1 \times V2)+(V3 \times V4)$. In other words, the image brightness configuration value L during the data period DP can be regarded as total energy of the first backlight square wave B1 and the second backlight square wave B2. Further, in the display system 100, all light emitting components of a backlight array of the backlight module 14 are enabled simultaneously at the beginning of the second time interval T2 (i.e., the fourth value V4 of the first backlight square wave B1 in FIG. 3) and at the beginning of the third time interval T3 (i.e., the second value V2 of the second backlight square wave B2 in FIG. 3). All light emitting components are disabled simultaneously after the second time interval T2 elapses and after the third time interval T3 elapses. Therefore, for human eyes, an image is visible during the third time interval T3 with a time length equal to the second value V2, and during the second time interval T2 with a time length equal to the fourth value V4. As shown in FIG. 3, the image is visible during the time length (i.e., equal to the second value V2) of the second backlight square wave B2. Since the second backlight square wave B2 is allocated within the blank time interval BLK, liquid crystal polarities of pixels in the pixel array 12 are already stable when the backlight module 14 is enabled according to the second backlight square wave B2. Similarly, the image is visible during the time length (i.e., equal to the fourth value V4) of the first backlight square wave B1. Since the first backlight square wave B1 is allocated within the first time interval T1 of the first data square wave D1, liquid crystal polarities of pixels in the pixel array 12 are still operated under a transient state when the backlight module 14 is enabled according to the first backlight square wave B1. For reducing time length of "visible" transient state of the pixels during the data period DP, the first value V1, the second value V2, the third value V3, the fourth value V4 can be appropriately adjusted according to the image brightness configuration value L, as illustrated below.

Figure 4:
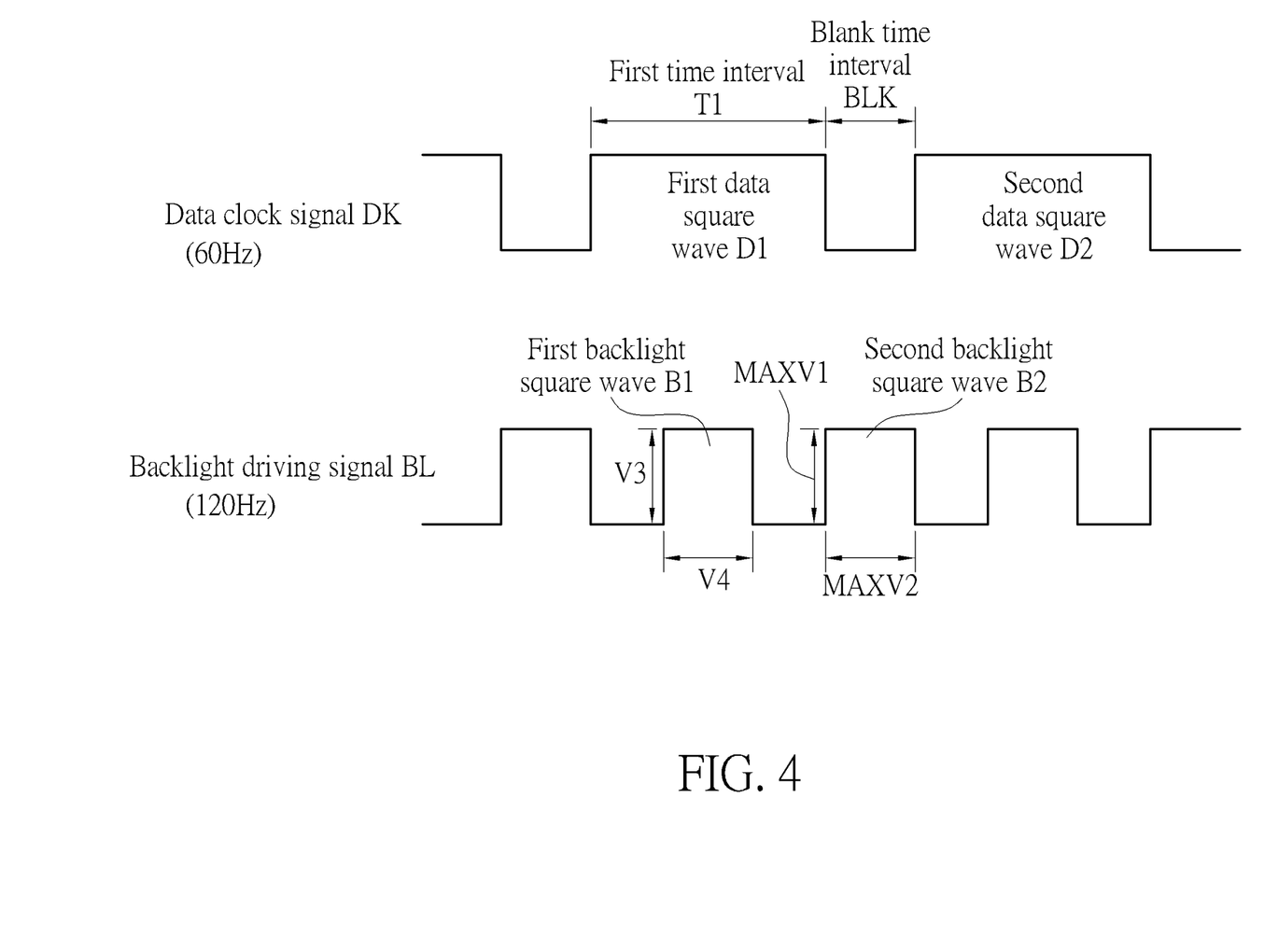
FIG. 4 is an illustration of widths and heights of the first backlight square wave and the second backlight square wave of the display system in FIG. 1 when an image brightness configuration value is greater than a threshold.

FIG. 4 is an illustration of widths and heights of the first backlight square wave B1 and the second backlight square wave B2 of the display system 100 when the image brightness configuration value L is greater than a threshold. As previously mentioned, the liquid crystal polarities of pixels in the pixel array 12 are still operated under a transient state when the backlight module 14 is enabled according to the first backlight square wave B1. However, the liquid crystal polarities of pixels in the pixel array 12 are already stable when the backlight module 14 is enabled according to the second backlight square wave B2. Therefore, when the image brightness configuration value L is greater than the threshold (i.e., such as greater than 50% maximum configurable image brightness), the width and the height of the second backlight square wave B2 are maximized by the display system 100. Then, the first backlight square wave B1 can be adjusted according to the "maximum" second backlight square wave B2 and the image brightness configuration value L. For example, when the image brightness configuration value L is greater than the threshold, the first value V1 (i.e., height) of the second square wave B2 can be set to a maximum configurable square wave height MAXV1. The second value V2 (i.e., width) of the second backlight square wave B2 can be set to a maximum configurable square wave width MAXV2. In the embodiment, the maximum configurable square wave height MAXV1 and the maximum configurable square wave width MAXV2 can be used for maximizing energy of the second backlight square wave B2 within the blank time interval BLK. After the height and the width of the second backlight square wave B2 are maximized, the third value V3 (i.e., height) and the fourth value V4 (i.e., width) of the first backlight square wave B1 can be derived as (V3×V4)=L−(MAXV1×MAXV2). In other words, the third value V3 and the fourth value V4 of the first backlight square wave B1 can be determined by the first value V1 (equal to MAXV1), the second value V2 (equal to MAXV2), and the image brightness configuration value L. Further, under the condition of (V3×V4)=L−(MAXV1×MAXV2), for minimizing time length of "visible" transient state of the pixels, the third value V3 can be set to the maximum configurable square wave height in order to minimize the fourth value V4. Since the fourth value V4 can be minimized, the time length of "visible" transient state of the pixels can also be minimized. For example, under the condition of (V3×V4)=L−(MAXV1×MAXV2), the fourth value V4 can be written as [L−(MAXV1×MAXV2)]/V3. When the third value V3 is set to the maximum configurable square wave height, the fourth value V4 can be minimized. By doing so, the image displayed by using the first backlight square wave B1 and the second backlight square wave B2 can be consistent with the image brightness configuration value L. Also, stability of the displayed image can be increased.

Figure 5:
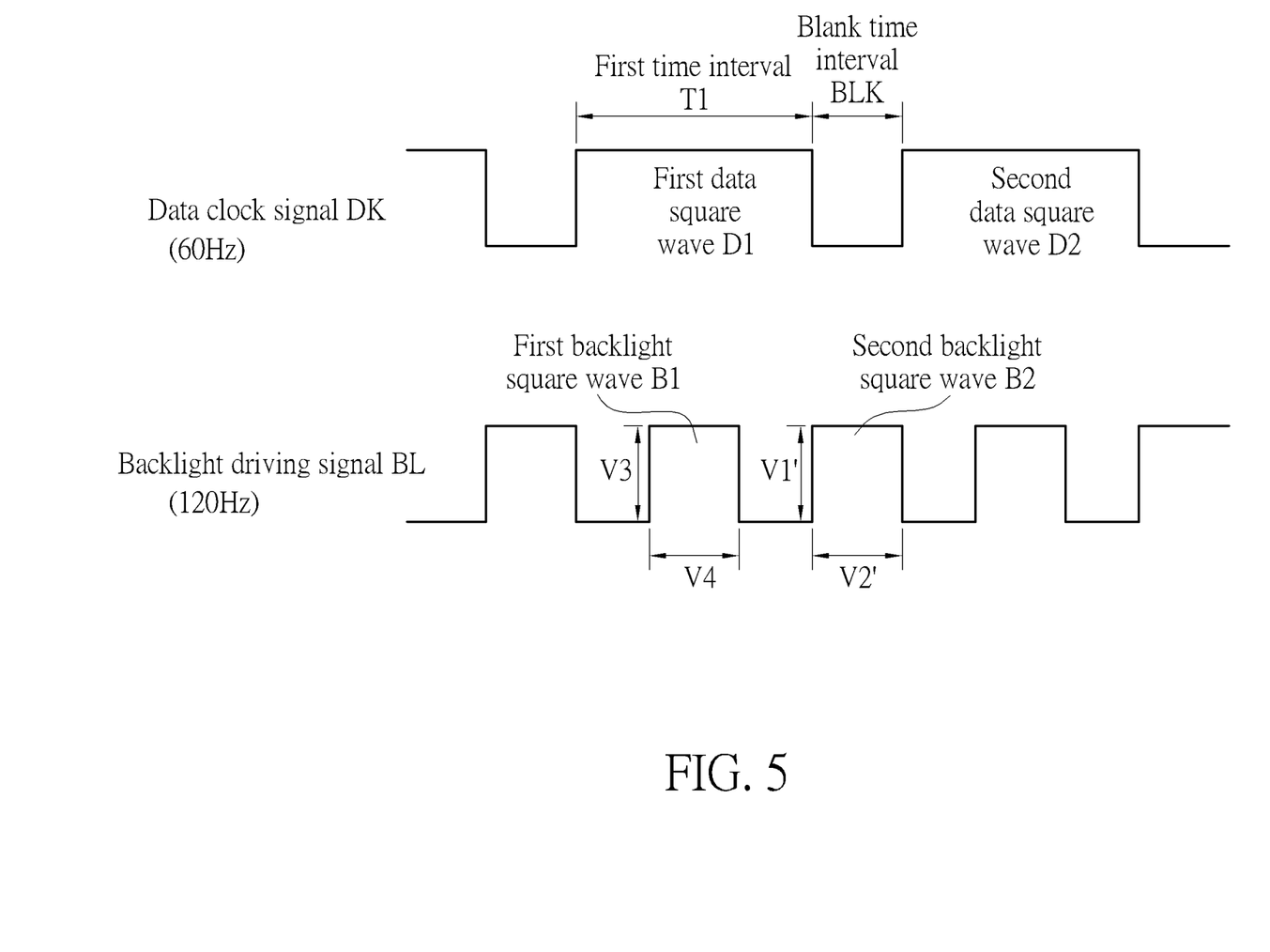
FIG. 5 is an illustration of widths and heights of the first backlight square wave and the second backlight square wave of the display system in FIG. 1 when the image brightness configuration value is smaller than the threshold.

FIG. 5 is an illustration of widths and heights of the first backlight square wave B1 and the second backlight square wave B2 of the display system 100 when the image brightness configuration value L is smaller than the threshold. As previously mentioned, the liquid crystal polarities of pixels in the pixel array 12 are operated under the transient state when the backlight module 14 is enabled according to the first backlight square wave B1. However, the liquid crystal polarities of pixels in the pixel array 12 are already stable when the backlight module 14 is enabled according to the second backlight square wave B2. Therefore, when the image brightness configuration value L is smaller than the threshold (i.e., such as smaller than 50% maximum configurable image brightness), the display system 100 performs energy allocation. A limitation of the energy allocation is to avoid allocating all energy required for reaching the image brightness configuration value L to the second backlight square wave B2. A reason is illustrated below. When all energy required for reaching the image brightness configuration value L is allocated to the second backlight square wave B2, the first backlight square wave B1 is absent. The absence of the first backlight square wave B1 results in halving the frequency of the backlight driving signal BL, leading to the image flickering effect. Thus, even if the image brightness configuration value L is smaller than the threshold, existences of the first backlight square wave B1 and the second backlight square wave B2 are essential. In order to ensure the existences of the first backlight square wave B1 and the second backlight square wave B2, the first value V1 (i.e., height) of the second backlight square wave B2 can be set to a small height value, which is smaller than the maximum configurable square wave height and is denoted as V1'. Further, the second value V2 (i.e., width) of the second backlight square wave B2 can be set to a small width value, which is smaller than the maximum configurable square wave width and is denoted as V2'. After the height and the width of the second backlight square wave B2 are configured, the third value V3 and the fourth value V4 of the first backlight square wave B1 can be derived as (V3×V4)=L−(V1'×V2') for V3×V4>0. Since V3×V4>0, the absence of the first backlight square wave B1 can be avoided. Therefore, the frequency of the backlight driving signal BL can be maintained for avoiding the image flickering effect. Similarly, for minimizing time length of "visible" transient state of the pixels, the third value V3 can be maximized in order to minimize the fourth value V4. Since the fourth value V4 can be minimized, the time length of "visible" transient state of the pixels can also be minimized. By doing so, the image displayed by using the first backlight square wave B1 and the second backlight square wave B2 can be consistent with the image brightness configuration value L. In aforementioned embodiments, the first value V1 and the third value V3 can be regarded as two voltage levels or two power levels of two square waves. The second value V2 and the fourth value V4 can be regarded as two time lengths. For example, the second value V2 can be regarded as a time length from timing of a rising edge of the second backlight square wave B2 to timing of a falling edge of the second backlight square wave B2. The fourth value V4 can be regarded as a time length from timing of a rising edge of the first backlight square wave B1 to timing of a falling edge of the first backlight square wave B1.

In aforementioned embodiments, the image brightness configuration value L can be a user-defined image brightness configuration value. For example, a user can use an "on screen display (OSD)" function for adjusting image brightness displayed on the screen. Also, the user can use a remote controller for adjusting the image brightness directly. However, the image brightness configuration value L can be a system-default image brightness configuration value or adjusted by the display system 100 automatically. For example, when an automatic image brightness adjustment function is introduced to the display system 100, the image brightness configuration value L can be optimally adjusted according to an ambient light signal. Any reasonable method for adjusting the image brightness configuration value L falls into the scope of the present invention.

Figure 6:
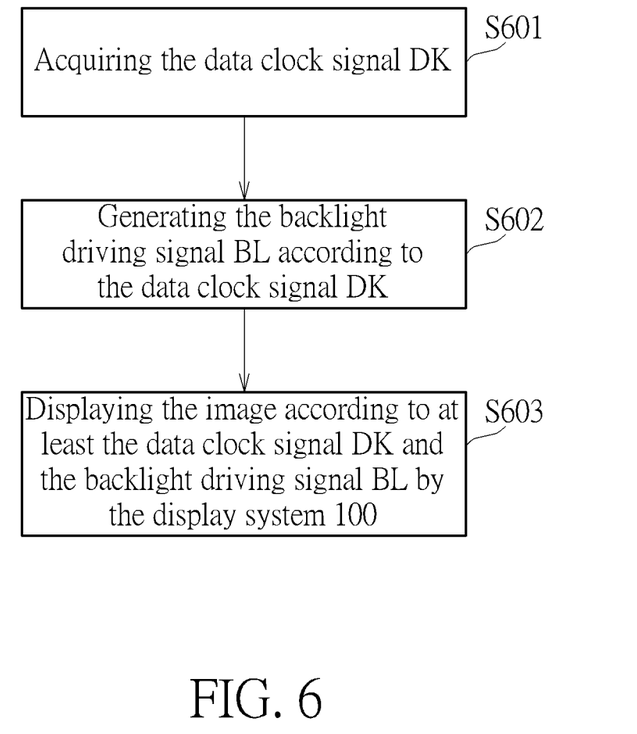
FIG. 6 is a flow chart of an image display method of the display system in FIG. 1.

FIG. 6 is a flow chart of an image display method of the display system 100. The image display method includes step S601 to step S603. Any reasonable modification of step S601 to step S603 falls into the scope of the present invention. Step S601 to step S603 are illustrated below.

step S601: acquiring the data clock signal DK;

step S602: generating the backlight driving signal BL according to the data clock signal DK;

step S603: displaying the image according to at least the data clock signal DK and the backlight driving signal BL by the display system 100.

Step S601 to step S603 are illustrated in aforementioned embodiments. Thus, illustrations are omitted here. The data clock signal DK can include several square waves, such as the first data square wave D1 and the second data square wave D2. The first data square wave D1 and the second data square wave D2 can be periodically transmitted. The data clock signal DK has a frequency equal to 1/DP. DP is denoted as the data period. The backlight driving signal BL includes the first backlight square wave B1 and the second backlight square wave B2. The first backlight square wave B1 and the second backlight square wave B2 can be periodically transmitted. The backlight driving signal BL has a frequency equal to 1/BP. BP is denoted as the backlight period. The data period DP is greater than the backlight period BP.

To sum up, the present invention discloses an image display method and a display system. The display system uses a backlight driving signal with a frequency greater than a frequency of a data clock signal for avoiding an unpleasant image flickering effect. Further, to improve stability of the displayed image, the display system can optimize waveforms of the backlight driving signal. When an image brightness configuration value is greater than a threshold, energy of the backlight driving signal during a blank time interval is maximized. Therefore, stability of the displayed image can be maintained in each visible image time slot during a data period. When the image brightness configuration value is smaller than the threshold, energy of the backlight driving signal during the blank time interval is limited. Therefore, the absence of the backlight driving square wave during the data clock interval can be avoided. The frequency of the backlight driving signal can be maintained. In the display system 100, since the frequency of the backlight driving signal is greater than the frequency of the data clock signal, the unpleasant image flickering effect can be avoided since visual persistence of human eyes can be easily triggered. In other words, the display system of the present invention can provide satisfactory visual experience for any image brightness.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image display method comprising:
acquiring a data clock signal;
generating a backlight driving signal according to the data clock signal;
wherein the data clock signal comprises a first data square wave and a second data square wave, the first data square wave and the second data square wave are periodically transmitted, each of the first data square wave and the second data square wave has a data period, the backlight driving signal comprises a first backlight square wave and a second backlight square wave, the first backlight square wave and the second backlight square wave are periodically transmitted, each of the first backlight square wave and the second backlight square wave has a backlight period, and the data period is greater than the backlight period;

wherein the first data square wave and/or the second data square wave corresponds to a first time interval, a blank time interval is allocated between the first data square wave and the second data square wave, a second time interval corresponding to the first backlight square wave is within the first time interval, and a third time interval corresponding to the second backlight square wave is within the blank time interval;

setting a height of the second backlight square wave to a first value;
setting a width of the second backlight square wave to a second value;
setting a height of the first backlight square wave to a third value; and
setting a width of the first backlight square wave to a fourth value;

wherein the first value, the second value, the third value, and the fourth value are positive values, wherein the third value and the fourth value are determined by the first value, the second value, and an image brightness configuration value, wherein when the first value and the second value are two maximum configuration values, the second value is equal to a maximum configurable square wave width during the blank time interval, and the first value is equal to a maximum configurable square wave height during the blank time interval; and displaying an image according to at least the data clock signal and the backlight driving signal by a display system.

2. A display system comprising:
a processor configured to generate a data clock signal and generate a backlight driving signal according to the data clock signal;
a pixel array configured to generate an image;
an image driving device coupled to the processor and the pixel array and configured to control the pixel array according to the data clock signal;
a backlight module configured to generate a backlight signal; and
a backlight driving device coupled to the processor and the backlight module and configured to control the backlight module according to the backlight driving signal;

wherein the data clock signal comprises a first data square wave and a second data square wave, the first data square wave and the second data square wave are periodically transmitted, each of the first data square wave and the second data square wave has a data period, the backlight driving signal comprises a first backlight square wave and a second backlight square wave, the first backlight square wave and the second backlight square wave are periodically transmitted, each of the first backlight square wave and the second backlight square wave has a backlight period, and the data period is greater than the backlight period;

wherein the first data square wave and/or the second data square wave corresponds to a first time interval, a blank time interval is allocated between the first data square wave and the second data square wave, a second time interval corresponding to the first backlight square wave is within the first time interval, and a third time interval corresponding to the second backlight square wave is within the blank time interval;

wherein a height of the second backlight square wave is equal to a first value, a width of the second backlight square wave is equal to a second value, a height of the first backlight square wave is equal to a third value, a width of the first backlight square wave equal to a fourth value, and the first value, the second value, the third value, and the fourth value are positive values;

wherein the third value and the fourth value are determined by the first value, the second value, and an image brightness configuration value;

wherein when the first value and the second value are two maximum configuration values, the second value is equal to a maximum configurable square wave width during the blank time interval, and the first value is equal to a maximum configurable square wave height during the blank time interval.

3. The system of claim 2, wherein the third value is equal to the maximum configurable square wave height in order to minimize the fourth value so that the image displayed by using the first backlight square wave and the second backlight square wave is consistent with the image brightness configuration value.

4. The system of claim 2, wherein:
when the image brightness configuration value is greater than a threshold, the first value is equal to the maximum configurable square wave height during the blank time interval; and
when the image brightness configuration value is smaller than the threshold, the first value is smaller than the maximum configurable square wave height, and/or the second value is smaller than a maximum configurable square wave width.

5. The system of claim 2, wherein all light emitting components of a backlight array of the backlight module are enabled simultaneously at a beginning of the second time interval and at a beginning of the third time interval, and all light emitting components are disabled after the second time interval elapses and the third time interval elapses.

6. An image display method comprising:
acquiring a data clock signal;
generating a backlight driving signal according to the data clock signal, wherein the backlight driving signal comprises a first backlight square wave and a second backlight square wave;
setting a height of the second backlight square wave to a first value;
setting a width of the second backlight square wave to a second value;
setting a height of the first backlight square wave to a third value;
setting a width of the first backlight square wave to a fourth value; and
displaying an image according to at least the data clock signal, the first value, the second value, the third value, and the fourth value of the backlight driving signal by a display system;
wherein the data clock signal comprises a first data square wave and a second data square wave, the first data square wave and the second data square wave are periodically transmitted, each of the first data square wave and the second data square wave has a data period, the first backlight square wave and the second backlight square wave are periodically transmitted;
wherein the first data square wave and/or the second data square wave corresponds to a first time interval, a blank time interval is allocated between the first data square wave and the second data square wave, a second time interval corresponding to the first backlight square wave is within the first time interval, and a third time interval corresponding to the second backlight square wave is within the blank time interval; and wherein the first value, the second value, the third value, the fourth value are positive values, the third value and the fourth value are determined by the first value, the second value, and an image brightness configuration value.

7. The method of claim 6, wherein when the first value and the second value are two maximum configuration values, the second value is equal to a maximum configurable square wave width during the blank time interval, and the first value is equal to a maximum configurable square wave height during the blank time interval.

8. The method of claim 6, wherein:
when the image brightness configuration value is greater than a threshold, the first value is equal to a maximum configurable square wave height during the blank time interval; and
when the image brightness configuration value is smaller than the threshold, the first value is smaller than the maximum configurable square wave height, and/or the second value is smaller than a maximum configurable square wave width.

9. An image display method, comprising:
acquiring a data clock signal;
generating a backlight driving signal according to the data clock signal;
setting a height of the second backlight square wave to a first value;
setting a width of the second backlight square wave to a second value;
setting a height of the first backlight square wave to a third value;
setting a width of the first backlight square wave to a fourth value; and
displaying an image according to at least the data clock signal, the first value, the second value, the third value, and the fourth value of the backlight driving signal by a display system;
wherein the data clock signal comprises a data waveform comprising a first data square wave corresponding to a scan time followed by a blank time interval corresponding to a blanking time such that the addition of the first data square wave and the blank time interval corresponds to a frame period, the backlight driving signal comprises a backlight waveform comprising a first and second waveform, the first waveform comprising a first backlight off time followed by a first backlight square wave, the second waveform comprising a second backlight off time followed by a second backlight square wave within the blank time interval, the backlight waveform synchronized with the frame period; and
wherein the first value, the second value, the third value, the fourth value are positive values, the third value and the fourth value are determined by the first value, the second value, and an image brightness configuration value.

10. The method of claim 9, wherein the width and height of the first backlight square wave are calculated in order to transmit a minimum prefixed amount of energy independently of the image brightness configuration value while the width and the height of the second backlight square wave are calculated in order to transmit the energy difference between the energy value derived from the image brightness configuration value and the energy transmitted by the first backlight square wave is such that the width of the second backlight square wave is never wider than the blank time interval for all possible image brightness configuration values.

11. The method of claim 10, wherein the first backlight square wave width is reduced to the minimum possible value and the height is calculated accordingly to produce the minimum prefixed amount of energy.

12. The method of claim 9, wherein the first data square wave and/or the second data square wave corresponds to a first time interval, a blank time interval is allocated between the first data square wave and the second data square wave, a second time interval corresponding to the first backlight square wave is within the first time interval, and a third time interval corresponding to the second backlight square wave is within the blank time interval and the method further comprises:
   enabling all light emitting components of a backlight array of a backlight module simultaneously at a beginning of the second time interval and at a beginning of the third time interval; and
   disabling all light emitting components simultaneously after the second time interval elapses and after the third time interval elapses.

13. The method of claim 9, wherein a frequency of the backlight driving signal is equal to the data clock signal.

14. A display system, comprising:
   a processor configured to generate a data clock signal and generate a backlight driving signal according to the data clock signal;
   a pixel array configured to generate an image;
   an image driving device coupled to the processor and the pixel array and configured to control the pixel array according to the data clock signal;
   a backlight module configured to generate a backlight signal; and
   a backlight driving device coupled to the processor and the backlight module and configured to control the backlight module according to the backlight driving signal;
   wherein the data clock signal comprises a data waveform comprising a first data square wave corresponding to a scan time followed by a blank time interval corresponding to a blanking time such that the addition of the first data square wave and the blank time interval corresponds to a frame period, the backlight driving signal comprises a backlight waveform comprising a first and second waveform, the first waveform comprising a first backlight off time followed by a first backlight square wave while liquid crystal polarities of pixels in the pixel array are still operated under a transient state, the second waveform comprising a second backlight off time followed by a second backlight square wave within the blank time interval while liquid crystal polarities of pixels in the pixel array are already stable, the backlight waveform synchronized with the frame period.

15. The system of claim 14, wherein the first data square wave corresponds to a first time interval, the blank time interval is allocated between the first data square wave and a second data square wave of a next frame period, a second time interval corresponding to the first backlight square wave is within the first time interval, and a third time interval corresponding to the second backlight square wave is within the blank time interval.

16. The system of claim 15, wherein all light emitting components of a backlight array of the backlight module are enabled simultaneously at a beginning of the second time interval and at a beginning of the third time interval, and all light emitting components are disabled after the second time interval elapses and the third time interval elapses.

17. The system of claim 15, wherein a height of the second backlight square wave is equal to a first value, a width of the second backlight square wave is equal to a second value, a height of the first backlight square wave is equal to a third value, a width of the first backlight square wave equal to a fourth value, and the first value, the second value, the third value, and the fourth value are positive values.

18. The system of claim 17, wherein the third value and the fourth value are determined by the first value, the second value, and an image brightness configuration value.

19. The system of claim 18, wherein the width and height of the first backlight square wave are calculated in order to transmit a minimum prefixed amount of energy independently of the image brightness configuration value while the width and the height of the second backlight square wave are calculated in order to transmit the energy difference between the energy value derived from the image brightness configuration value and the energy transmitted by the first backlight square wave is such that the width of the second backlight square wave is never wider than the blank time interval for all possible image brightness configuration values.

20. The system of claim 19, wherein the first backlight square wave width is reduced to the minimum possible value and the height is calculated accordingly to produce the minimum prefixed amount of energy, and wherein a frequency of the backlight driving signal is equal to the data clock signal.

* * * * *